(12) United States Patent
Baeuerle et al.

(10) Patent No.: US 11,041,817 B2
(45) Date of Patent: Jun. 22, 2021

(54) MICROWAVE-BASED MEASURING DEVICE

(71) Applicant: BERTHOLD TECHNOLOGIES GmbH & Co. KG, Bad Wildbad (DE)

(72) Inventors: Joerg Baeuerle, Baiersbronn (DE); Rachid El Korch, Schoemberg (DE); Steffen Mueller, Pforzheim (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 0 days.

(21) Appl. No.: 16/904,234

(22) Filed: Jun. 17, 2020

(65) Prior Publication Data
US 2021/0010952 A1 Jan. 14, 2021

(30) Foreign Application Priority Data

Jul. 11, 2019 (DE) ...................... 10 2019 210 303.0

(51) Int. Cl.
*G01N 22/04* (2006.01)
(52) U.S. Cl.
CPC .................................. *G01N 22/04* (2013.01)
(58) Field of Classification Search
CPC .............................. G01N 22/04; G01N 22/00
USPC ........................................................ 702/23
See application file for complete search history.

(56) References Cited

U.S. PATENT DOCUMENTS

| | | | | |
|---|---|---|---|---|
| 6,239,600 | B1* | 5/2001 | Suzuki | G01N 22/04 |
| | | | | 324/637 |
| 2018/0137691 | A1* | 5/2018 | Satou | G06F 13/38 |
| 2020/0249069 | A1* | 8/2020 | Mueller | G01N 9/24 |
| 2020/0322703 | A1* | 10/2020 | Bures | G06N 20/00 |

FOREIGN PATENT DOCUMENTS

| | | |
|---|---|---|
| DE | 42 06 532 A1 | 9/1993 |
| DE | 102 12 307 A1 | 10/2003 |
| DE | 10 2004 014 338 A1 | 10/2004 |

OTHER PUBLICATIONS

German-language Search Report issued in German Application No. 10 2019 210 303.0 dated Apr. 22, 2020 with partial English translation (five (5) pages).

* cited by examiner

*Primary Examiner* — Michael P Nghiem
*Assistant Examiner* — Dacthang P Ngo
(74) *Attorney, Agent, or Firm* — Crowell & Moring LLP

(57) ABSTRACT

A microwave-based measuring device includes a number n of sensors, each sensor of the number n of sensors being embodied to generate associated sensor data such that, overall, a number n of items of sensor data are generated by way of the number n of sensors. A measurement variable calculation unit is embodied to calculate a number m of measurement variable values depending on the number n of items of sensor data on the basis of values of a number d of parameters. A learning unit is embodied to calculate the values of the number d of parameters on the basis of training data.

5 Claims, 2 Drawing Sheets

MICROWAVE-BASED MEASURING DEVICE

BACKGROUND AND SUMMARY OF THE INVENTION

The invention relates to a microwave-based measuring device.

Microwave-based measuring devices comprising microwave sensors are frequently used in process metrology for the purposes of measuring process variables or material properties, for example for measuring moisture, concentration or content, etc.

The invention is based on the object of providing such a microwave-based measuring device which facilitates a reliable determination of values for a number of variables to be measured, even in the case of complicated microwave-based measurement problems.

The invention achieves this object by a microwave-based measuring device according to the claimed invention.

The microwave-based measuring device has a number n of sensors, where n is a natural number greater than zero. By way of example, the number n can lie in a range between one and 12.

Each sensor of the number n of sensors is embodied to generate its associated sensor data such that, overall, a number n of items of sensor data are generated by means of the number n of sensors. By way of example, the sensor data each are data in a digital representation, for example with a resolution between 8 bits and 64 bits. By way of example, the digital sensor data are generated continuously at a specified temporal repetition rate. By way of example, the data of all n sensors are generated simultaneously or with a known temporal relationship with respect to one another every 100 ms.

The microwave-based measuring device further comprises at least one measurement variable calculation unit which is embodied to calculate a number m of measurement variable values or process measurement values depending on the number n of items of sensor data on the basis of values of a number d of parameters. In particular, the number d of parameters are parameters of a hypothesis function h which approximates a measuring function f. The sensor data may also have a time offset. The number m is a natural number greater than zero and, for example, can lie in a range between one and 4. The number d is a natural number greater than zero and, for example, can lie in a range between one and 500. By way of example, the measurement variable values represent a corresponding number of process variables to be measured.

The microwave-based measuring device further comprises a learning unit, the learning unit being embodied to calculate the values of the number d of parameters on the basis of training data.

The learning unit, the number of sensors and the measurement variable calculation unit can be provided spatially together or spatially separated from one another. By way of example, the number of sensors and the measurement variable calculation unit can be disposed at the location of the measuring problem, i.e., in the field, and the learning unit can be disposed spatially separated therefrom. By way of example, the learning unit can be realized by means of a powerful computer which calculates the number d of parameters on the basis of the training data, the number d of parameters subsequently being made available to the measurement variable calculation unit, for example by virtue of the number d of parameters being transferred from the learning unit to the measurement variable calculation unit via a data network. Naturally, the learning unit and the measurement variable calculation unit, and optionally the number n of the sensors, too, can be integrated in a common physical device.

According to one embodiment, the measurement variable calculation unit has at least one feature extraction unit which is embodied to extract feature data from the number n of items of sensor data, in particular on the basis of the values of the number d of parameters, the at least one measurement variable calculation unit being embodied to calculate the number m of measurement variable values from the feature data on the basis of the values of the number d of parameters.

According to one embodiment, the number n of sensors are selected from the set of sensors consisting of: at least one microwave sensor, at least one sensor which is embodied to generate sensor data in the form of temperature data, at least one sensor which is embodied to generate sensor data in the form of conductivity data, at least one radiometric sensor, in particular one radiometric sensor which is embodied to generate sensor data in the form of a count rate or radiation intensity data and/or a radiometric sensor which is embodied to generate sensor data in the form of information about radiometric spectra, at least one sensor which is embodied to generate sensor data in the form of acceleration data, at least one sensor which is embodied to generate sensor data in the form of speed data, at least one sensor which is embodied to generate sensor data in the form of position data, and at least one sensor, in particular in the form of an ultrasonic sensor or laser sensor, which is embodied to generate sensor data in the form of information about a load level profile, and at least one sensor which is embodied to generate sensor data in the form of moisture data.

According to one embodiment, the learning unit is embodied to extract training sensor data from the training data and extract target values of the number m of measurement variable values associated with the training sensor data, the measurement variable calculation unit being embodied to calculate training values of the number m of measurement variable values depending on the training sensor data, and the learning unit being embodied to calculate the values of the number d of parameters on the basis of the target values of the number m of measurement variable values and the training values of the number m of measurement variable values.

According to one embodiment, the at least one measurement variable is selected from the set of measurement variables consisting of: moisture, dry matter content, sugar content, concentration, material composition, in particular quantities, fill level, positions and/or thicknesses of individual material layers, density, discharge rate, in particular overall discharged mass, throughput, in particular mass flow, and material composition, in particular quantities.

In the case of complex microwave-based measuring problems, the relationships between sensor data and measurement variable values are not always exactly describable in analytic form. Therefore, this relationship previously had to be approximated by suitable physical and mathematical models. However, frequently, the measurement model is unknown or approximated too simplistically, no suitable model is known for sensor fusion and/or the measurement model is too complicated. Therefore, the quality of the measurement variable values or process values calculated in the measuring system suffers overall.

According to the invention, this problem is solved by virtue of the microwave-based measuring device establishing relationships between sensor data and measurement variable values on the basis of training data, using artificial intelligence processes, such as "machine learning" or "deep learning", in an automated and self-learning fashion, without explicit knowledge of an analytical measurement equation.

This increases the measurement accuracy by reducing systematic errors. The quality and accuracy of the calculated measurement variable values is increased since the microwave-based measuring device learns the totality of all process influences with the aid of the training data. In addition to the known influences, this also contains, in particular, unknown disturbing influences, the existence of which are unknown during start-up, for example. Therefore, the microwave-based measuring device may even contain more expert knowledge than a human operator and process expert in the field. This leads to significant improvement in the measurement variable value accuracy.

Further, previously unsolvable measuring problems become solvable. In contrast to conventional measuring systems in microwave-based process metrology, no explicit measurement model need be known in advance according to the invention. Rather, the microwave-based measuring device creates the measurement model itself by means of artificial intelligence. The physical process to be measured can consequently be treated as a black box, the internal logic of which is unknown and learned and organized by the microwave-based measuring device itself. As a result, measurement problems for novel, previously foreign or unsolvable physical processes can be presented according to the invention. This offers a significant advantage since new markets and problem fields can be opened up without expert knowledge or with only rudimentary specialist knowledge in the respective domain. The microwave-based measuring device according to the invention acquires the expert knowledge itself.

Further, the microwave-based measuring device according to the invention requires less storage space in comparison with conventional solutions with a similar capability. If the amount of information processed and learned during the learning phase according to the invention is compared to the number of model parameters, the memory requirements of the microwave-based measuring device according to the invention is comparatively low. If the intention were to achieve similar measurement capabilities using conventional measuring devices (if this were even possible), comprehensive calibration tables would be necessary, which would exceed all memory limits of embedded systems.

Further, the microwave-based measuring device according to the invention facilitates shorter cycle times and higher refresh rates. The computational steps for processing the sensor data into the measurement variable values during the measurement procedure, performed in the microwave-based measuring device according to the invention, are mainly based on methods from linear algebra, specifically matrix-vector multiplications. On appropriate hardware, these operations are carried out in significantly more performant fashion than conventional procedural mathematical algorithms of microwave-based process metrology. This leads to shorter cycle times of the measurement system and, consequently, to higher refresh rates in the process control system on the customer side.

Further, the microwave-based measuring device according to the invention facilitates shorter design times. Since, according to the invention, only little expert knowledge from the respective specialist domain is necessary, individual customer solutions for novel measurement problems can be worked out more quickly. The associated measurement systems can be designed and individualized significantly more easily. This saves time and reduces costs.

Further, the microwave-based measuring device according to the invention facilitates a simpler operation. A calibration of the microwave-based measuring device according to the invention is very simple. Instead of determining complex, measurement application-specific calibration parameters like in the case of conventional measuring devices, it is only necessary to record training data according to the invention. Then, the microwave-based measuring device calibrates itself by means of the learning unit. For the operator, this unifies the calibration process in a measurement application-overarching manner and renders it to be significantly simpler.

The invention will be described in more detail below with reference to the drawings.

DETAILED DESCRIPTION OF THE DRAWINGS

Figure 1:
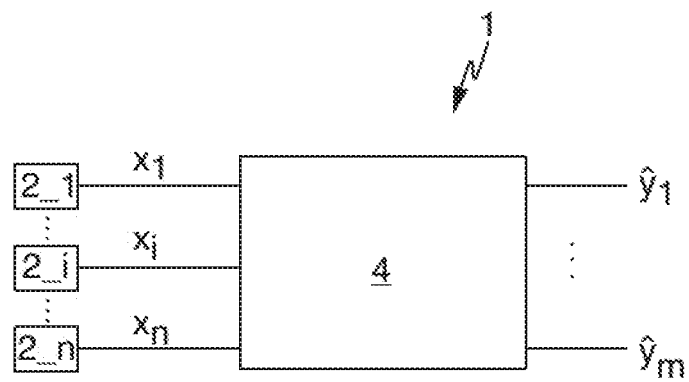
FIG. 1 very schematically shows a block diagram of a microwave-based measuring device according to the invention.

FIG. 1 very schematically shows a block diagram of a microwave-based measuring device 1.

The microwave-based measuring device 1 comprises a number n of sensors 2_1 to 2_n, each sensor 2_i of the number n of sensors (2_1 to 2_n) being embodied to generate associated sensor data $x_i$ such that, overall, a number n of items of sensor data $x_1, \ldots, x_n$ are generated by means of the number n of sensors 2_1 to 2_n.

Figure 4:
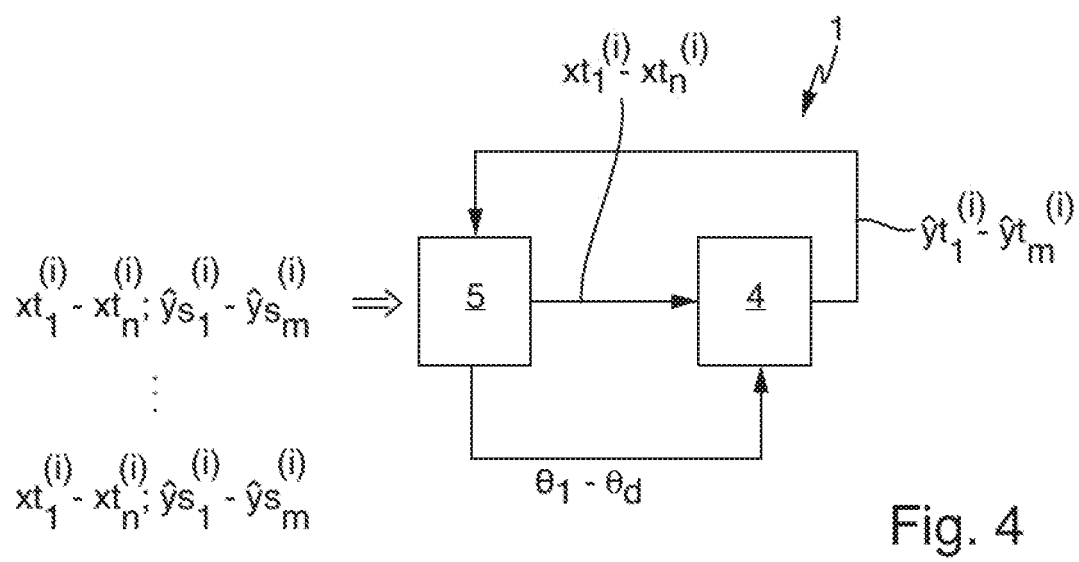
FIG. 4 very schematically shows a block diagram of the microwave-based measuring device, shown in FIG. 1, in a learning mode.

The microwave-based measuring device 1 further comprises a measurement variable calculation unit 4 which is embodied to calculate a number m of measurement variable values $\hat{y}_1, \ldots, \hat{y}_m$ depending on the number n of items of sensor data $x_1, \ldots, x_n$ on the basis of values of a number d of parameters $\theta_1, \ldots, \theta_d$. With reference to FIG. 4, the microwave-based measuring device 1 comprises a learning unit 5, the learning unit 5 being embodied to calculate the values of the number d of parameters $\theta_1, \ldots, \theta_d$ on the basis of training data $(xt_1^{(i)}, \ldots, xt_n^{(i)}); (\hat{y}s_1^{(i)}, \ldots, \hat{y}s_m^{(i)})$.

The microwave-based measuring device 1 converts input variables in the form of sensor values $x_1, \ldots, x_n$ which may also be time offset, into output variables in the form of the process measurement variables or measurement variable values $\hat{y}_1, \ldots, \hat{y}_m$.

The conversion depends on the model parameters $\theta_1, \ldots, \theta_d$, which are initially unknown and which are learned by way of the learning unit 5 by way of so-called machine learning. In the process, recorded training data, which are also referred to as learning data, are used; these may be formed from real data recorded during the operation and/or from simulation data.

Machine learning means that the microwave-based measuring device generates artificial knowledge from experience. The microwave-based measuring device learns from examples and can generalize these following the completion of the learning phase. This means that examples are not simply memorized but that the microwave-based measuring device recognizes patterns and rules in the training data. As a result, it can also assess unknown data (transfer of learning).

Preferably, the microwave-based measuring device uses learning techniques from so-called supervised learning, in which the microwave-based measuring device learns a measuring function from giving pairs of inputs and outputs. In the process, the correct measurement variable values for a number n of items of sensor data are provided during the learning, for example on the basis of a reference measurement or simulation.

Formally, the microwave-based measuring device thus approximates a measuring function $$f: (x_1, \ldots, x_n) \mapsto (y_1, \ldots, y_m),$$

which maps n input variables or items of sensor data $x_1, \ldots, x_n$ on m output variables or measurement variable values $y_1, \ldots, y_m$ by way of a suitable hypothesis function $$h_\theta: (x_1, \ldots, x_n) \mapsto (\hat{y}_1, \ldots, \hat{y}_m),$$

which maps the n items of sensor data $x_1, \ldots, x_n$ on m estimators $\hat{y}_1, \ldots, \hat{y}_m$ for $y_1, \ldots, y_m$ and which depends on the model parameters $\theta := (\theta_1, \ldots, \theta_d)$.

Here, each of the d individual model parameters $\theta_i$ is understood to mean one of the following three things:
- a mathematical object, in particular
  - a number,
  - a vector,
  - a function,
- a parameterized piece of program logic or source code or
- a piece of program logic or source code generated by code generator.

The model parameters $\theta_1, \ldots, \theta_d$ are learned by the learning algorithm from training data. More precisely, the training data consist of l (where l lies by way of example in a range between $10^5$ and $10^7$, in particular $l=10^6$ applies) training pairs $(xt^{(1)}, \hat{y}s^{(1)}), \ldots, (xt^{(l)}, \hat{y}s^{(l)})$, which, e.g., each have dimensions of n+m and, for example, each consist of a complete set of input data or training sensor data $xt^{(i)} := (xt_1^{(i)}, \ldots xt_n^{(i)})$ plus associated target values $\hat{y}s^{(i)} := (\hat{y}s_1^{(i)}, \ldots, \hat{y}s_m^{(i)})$ of the number m of measurement variable values, where $i=1, \ldots, l$. The target values $\hat{y}s_1^{(i)}, \ldots, \hat{y}s_m^{(i)}$ are also referred to as training labels.

On the basis of the training sensor data $xt_1^{(i)}, \ldots, xt_n^{(i)}$ the measurement variable calculation unit 4 calculates the training values $(\hat{y}t_1^{(i)}, \ldots, \hat{y}t_m^{(i)}) := h_\theta(xt_1^{(i)}, \ldots, xt_n^{(i)})$, dependent on the parameters $\theta_1, \ldots, \theta_d$, of the number m of measurement variable values $\hat{y}_1, \ldots, \hat{y}_m$. The learning unit 5 is embodied to calculate the values of the parameters $\theta_1, \ldots, \theta_d$ for $i=1, \ldots, l$ on the basis of the target values $\hat{y}s_1^{(i)}, \ldots \hat{y}s_m^{(i)}$ and the training values $\hat{y}t_1^{(i)}, \ldots, \hat{y}t_m^{(i)}$.

The calculation of the model parameters $\theta_1, \ldots, \theta_d$ can be performed iteratively multiple times. That is to say, random start parameters $\theta_1, \ldots, \theta_d$ are used at the outset. These are then improved iteratively by virtue of all e, $\hat{y}t_1^{(i)}, \ldots, \hat{y}t_m^{(i)}$ being calculated repeatedly on the basis of the respectively current $\theta_1, \ldots, \theta_d$ and then new, improved $\theta_1, \ldots, \theta_d$ being calculated therefrom until a predeterminable quality measure has been reached (e.g., minimum of a cost function). Additionally, a so-called mini batch, i.e., only a subset of the total of l data records $\hat{y}t_1^{(i)}, \ldots, \hat{y}t_m^{(i)}$, can be used in each iteration step in order to calculate new $(\theta_1, \ldots, \theta_d)$. That is to say, a plurality of iterations may be required in order to be able to take into account all of the training data—a so-called training epoch.

By way of example, the learning algorithm is performed once at start-up of the microwave-based measuring device or else repeatedly in real time during the operation of the microwave-based measuring device, e.g., by way of additional reference measurements.

Figure 2:
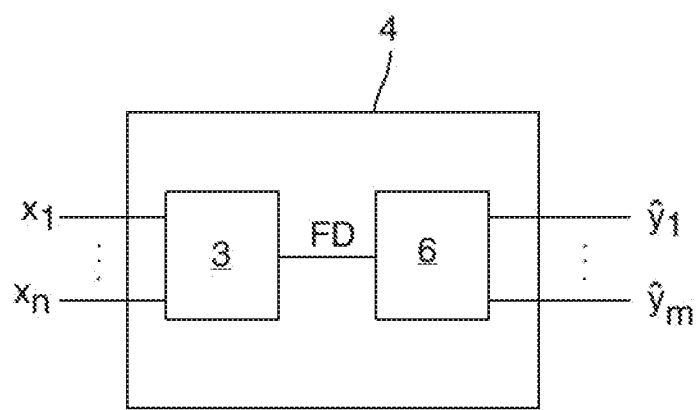
FIG. 2 very schematically shows a block diagram of an internal structure of an embodiment of a measurement variable calculation unit of the microwave-based measuring device shown in FIG. 1.

FIG. 2 very schematically shows a block diagram of an internal structure of an embodiment of a measurement variable calculation unit 4 of the microwave-based measuring device 1 shown in FIG. 1.

The measurement variable calculation unit 4 has an optional feature extraction unit 3 which is embodied to extract feature data FD from the number n of items of sensor data $x_1, \ldots, x_n$, in particular on the basis of the values of the number d of parameters $\theta_1, \ldots, \theta_d$.

Further, the measurement variable calculation unit 4 has an artificial intelligence (AI) unit 6, which is embodied to calculate the number m of measurement variable values, $\hat{y}_1, \ldots, \hat{y}_m$ from the feature data FD on the basis of the values of the number d of parameters $\theta_1, \ldots, \theta_d$.

Firstly, suitable features FD are extracted and transformed from the "raw" sensor data or measurement data $x_1, \ldots, x_n$, in order to generate input data for the AI unit 6 that are as meaningful as possible. In particular, one or more of the following techniques are used to this end: principal component analysis (PCA), discriminant analysis, statistical normalization, polynomial transformation, exponential transformation, logarithmic transformation.

It is understood that the feature extraction can also be dispensed with, and so the AI unit 6 uses the non-preprocessed, raw sensor data $x_1, \ldots, x_n$.

Depending on the measurement application, the AI unit 6 calculates a continuous output signal (regression method) or a discrete output signal (classification method). It is realized by an AI model from one of the four following categories:

1.) Models that, by way of metrics or suitable similarity functions, compare the input values with the stored training data in one stage or over a plurality of stages and then assign to these input values the output values of those training data that are "close" or similar in some sense.

By way of example, this can be one of the two AI models below:
  k-nearest neighbor classification
  k-nearest neighbor regression
Employed metrics or similarity functions could be, in particular, the following:
  p-norm
  Minkowski distance
  Kullback-Leibler divergence 2.) Models that calculate thresholds from the training data, the given input data then being compared thereto over a plurality of stages, usually in recursive fashion, in order to determine the associated output values.

By way of example, this can be one of the two AI models below:
  decision tree classification
  decision tree regression 3.) Models that estimate transition probabilities from the training data and combine these (possibly over a plurality of stages) in additive and multiplicative fashion using Bayes theorem in order to estimate a univariate or multivariate probability distribution of the output values for given input values. The output values with the highest probabilities are then assigned to the input values.

Figure 3:
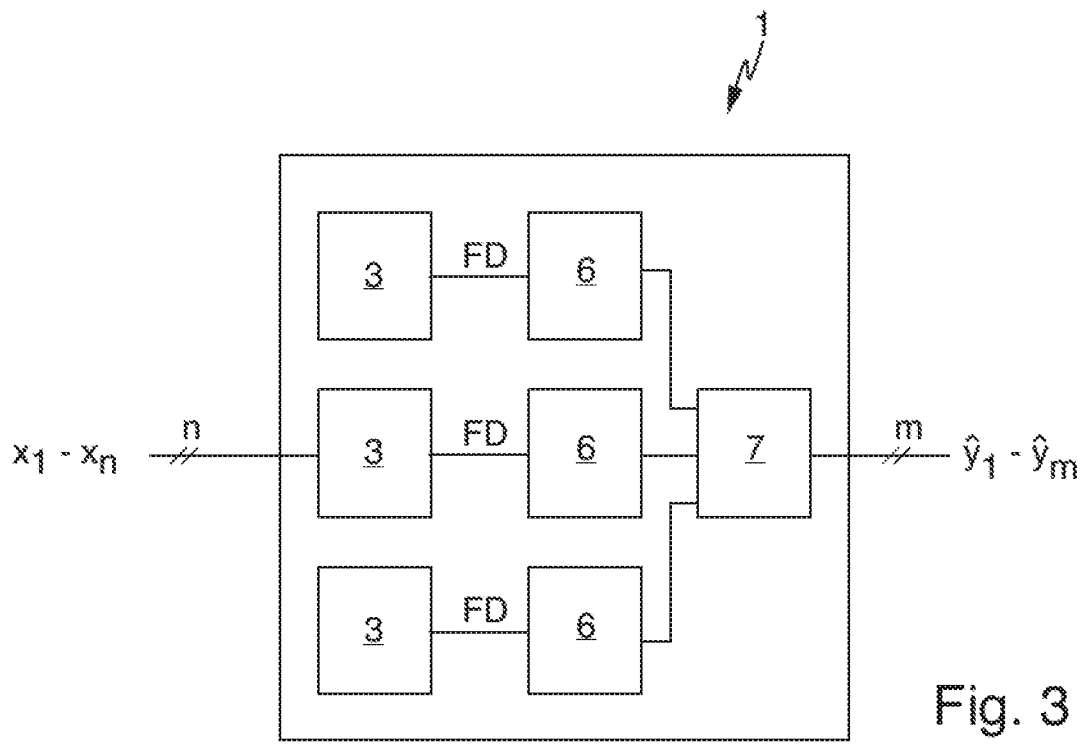
FIG. 3 very schematically shows a block diagram of an internal structure of a further embodiment of a measurement variable calculation unit of the microwave-based measuring device shown in FIG. 1.

By way of example, this can be one of the two AI models below:
  Bayes classifier, in particular a naive Bayes classifier
  Bayesian network classifier
4.) Models that apply, using linear algebra methods and in one stage or in a plurality of stages, so-called activation functions on linear combinations and/or convolutions of the transformed or untransformed input values in order then to calculate the output values therefrom.
By way of example, this can be one of the two AI models below:
  multiclass support vector machine (SVM) with one-vs-one or one-vs-all
    Employed kernel functions can be, in particular, the following:
      polynomial kernel
      Gaussian RBF kernel
      Laplace RBF kernel
      sigmoid kernel
      hyperbolic tangent kernel
      Bessel kernel
      Anova kernel
      linear splines kernel
  artificial neural network (ANN) and/or deep neural network (DNN)
  Employed activation functions can be, in particular, the following:
    identity
    sigmoid
    hyperbolic tangent
    ReLu
    softmax
    signum Referring to FIG. 3, which very schematically shows a block diagram of an internal structure of a further embodiment of a measurement variable calculation unit 4 of the microwave-based measuring device 1 shown in FIG. 1, it is optionally also possible to combine a number of a plurality of individual AI units 6 of the aforementioned categories to form a more powerful overall model with the aid of ensemble learning. In FIG. 3, three feature extraction units 3 and three respective downstream AI units 6 operate in parallel, with a so-called ensemble combination device 7 combining the respective data. By way of example, so-called bagging or so-called boosting can be used as ensemble learning technique.

The model parameters $(\theta_1, \ldots, \theta_d)$ of the AI unit(s) 6 are determined from the training data by machine learning, for example by way of one of the following techniques:
  by one-time or repeated minimization of metrics or maximization of similarity functions. In particular, these can be one or more of the following:
    entropy
    Gini impurity
    variance
    p-norm
    Minkowski distance
    Kullback-Leibler divergence
  by one-time or repeated minimization of a cost function, which depends on the chosen AI model and the functional arguments of which consist of the training data and the model parameters. The minimization may be subject to certain mathematical constraints (restriction of the search region), which may likewise depend on the training data and/or model parameters. The cost function is minimized in respect of the model parameters using mathematical optimization methods and techniques, in particular one or more of the following:
    backpropagation
    gradient descent-based method
    stochastic gradient descent-based method (e.g., AdaGrad, RMSProp or Adam)
    Gauss-Newton method
    quasi-Newton method
    linear programming
    quadratic programming Minimizing a cost function may include maximizing a quality function, in particular a maximum likelihood function or a maximum a posteriori probability function, in particular by changing the mathematical sign.

In order to prevent overfitting, improve the capability for learning transfer and consequently increase the capability of the AI unit(s) 6, additional regularization techniques can be used in the learning method, e.g.:
  p-norm penalty terms (L1, L2, etc.)
  dropout
  batch normalization Should nothing else be defined, all AI specialist terms should be understood as per the academic standard literature for AI and machine learning. In particular, see also:
1. Bishop, Christopher M.: "Pattern Recognition and Machine Learning"
2. Mitchell, Tom M.: "Machine Learning"
3. Russell, Stuart J. and Norvig, Peter: "Artificial Intelligence: A Modern Approach"
4. Richard O. Duda and Hart, Peter E. and David G. Stork: "Pattern Classification"
5. Aggarwal, Charu C.: "Neural Networks and Deep Learning: A Textbook"

What is claimed is:

1. A microwave-based measuring device, comprising:
a number n of sensors (2_1 to 2_n), each sensor (2_i) of the number n of sensors (2_1 to 2_n) being embodied to generate associated sensor data $(x_i)$ such that, overall, a number n of items of sensor data $(x_1, \ldots, x_n)$ are generated by way of the number n of sensors (2_1 to 2_n), wherein the number n of sensors (2_1 to 2_n) are selected from a set of sensors comprising at least one of:
  a capacitive microwave sensor which is embodied to generate sensor data in the form of an impedance which depends on properties of a measured material,
  a transmission-based microwave sensor which is embodied to generate sensor data in the form of a damping and/or a phase shift which depends on properties of the measured material, or
  a resonance-based microwave sensor which is embodied to generate sensor data in the form of a resonant frequency and/or a Q factor which depend(s) on properties of the measured material;
a computer to learn values of the number d of parameters $(\theta_1, \ldots, \theta_d)$ by executing a learning algorithm on the basis of training pairs $((xt_1^{(i)}, \ldots, xt_n^{(i)}); (\hat{y}s_1^{(i)}, \ldots, \hat{y}s_m^{(i)}))$;
a processor;
a memory in communication with the processor, the memory storing a plurality of instructions executable by the processor to cause the microwave-based measuring device to:
  convert, using a machine learning model, the number n of items of sensor data $(x_1, \ldots, x_n)$ to a number m of process measurement variable values $(\hat{y}_1, \ldots, \hat{y}_m)$ on the basis of the values of the number d of parameters $(\theta_1, \ldots, \theta_d)$.

2. The microwave-based measuring device according to claim 1, wherein the memory further includes instructions executable by the processor to cause the microwave-based measuring device to:

extract feature data from the number n of items of sensor data $(x_1, \ldots, x_n)$ on the basis of values of the number d of parameters $(\theta_1, \ldots, \theta_d)$, wherein converting the number n of items of sensor data $(x_1, \ldots, x_n)$ to the number m of process measurement variable values $(\hat{y}_1, \ldots, \hat{y}_m)$ is further based on inputting the extracted feature data to the machine learning model.

3. The microwave-based measuring device according to claim 2, wherein the set of sensors further comprises:
at least one microwave sensor,
at least one sensor which is embodied to generate sensor data in the form of temperature data,
at least one sensor which is embodied to generate sensor data in the form of conductivity data,
at least one radiometric sensor which is embodied to generate sensor data in the form of a count rate or radiation intensity data and/or a radiometric sensor which is embodied to generate sensor data in the form of information about radiometric spectra,
at least one sensor which is embodied to generate sensor data in the form of acceleration data,
at least one sensor which is embodied to generate sensor data in the form of speed data,
at least one sensor which is embodied to generate sensor data in the form of position data,
at least one sensor in the form of an ultrasonic sensor or laser sensor, which is embodied to generate sensor data in the form of information about a load level profile, or
at least one sensor which is embodied to generate sensor data in the form of pressure data.

4. The microwave-based measuring device according to claim 1, wherein the computer is further embodied to:
extract a number n of items of training sensor data $(xt_1^{(i)}, \ldots, xt_n^{(i)})$ recorded during operation and/or simulation of the microwave-based measuring device from the training pairs $((xt_1^{(i)}, \ldots, xt_n^{(i)}); (\hat{y}s_1^{(i)}, \ldots, \hat{y}s_m^{(i)}))$, and extract a number m of associated training labels $(\hat{y}s_1^{(i)}, \ldots, \hat{y}s_m^{(i)})$ of the number m of process measurement variable values $(\hat{y}_1, \ldots, \hat{y}_m)$, the memory further includes instructions executable by the processor to cause the microwave-based measuring device to:

generate a number m of training values $(\hat{y}t_1^{(i)}, \ldots, \hat{y}t_m^{(i)})$ of the number m of process measurement variable values $(\hat{y}_1, \ldots, \hat{y}_m)$ depending on the number n of items of training sensor data $(xt_1^{(i)}, \ldots, xt_n^{(i)})$, and the computer is further embodied to learn, by executing the learning algorithm, the values of the number d of parameters $(\theta_1, \ldots, \theta_d)$ on the basis of the number m of training labels $(\hat{y}s_1^{(i)}, \ldots, \hat{y}s_m^{(i)})$ of the number m of process measurement variable values $(\hat{y}_1, \ldots, \hat{y}_m)$ and the number m of training values $(\hat{y}t_1^{(i)}, \ldots, \hat{y}t_m^{(i)})$ of the number m of process measurement variable values $(\hat{y}_1, \ldots, \hat{y}_m)$.

5. The microwave-based measuring device according to claim 1, wherein the at least one process measurement variable is selected from the set of process measurement variables comprising:
moisture,
dry matter content,
sugar content,
concentration and
material composition.

* * * * *